R. HILLSON.
Hot Air Furnace.

No. 5,459.  Patented Feb. 29, 1848.

N. PETERS. Photo-Lithographer, Washington, D. C.

UNITED STATES PATENT OFFICE.

ROBERT HILLSON, OF ALBANY, NEW YORK.

HOT-AIR FURNACE.

Specification of Letters Patent No. 5,459, dated February 29, 1848.

*To all whom it may concern:*

Be it known that I, ROBERT HILLSON, of the city and county of Albany, in the State of New York, have invented a new and useful Hot-Air Furnace for the Purpose of Heating Dwelling-Houses and other Buildings by Hot Air; and I do hereby declare that the following is a full, clear, and exact description of the construction and operation of the same, reference being had to the annexed drawings, making part of this specification, in which—

Figure 1:
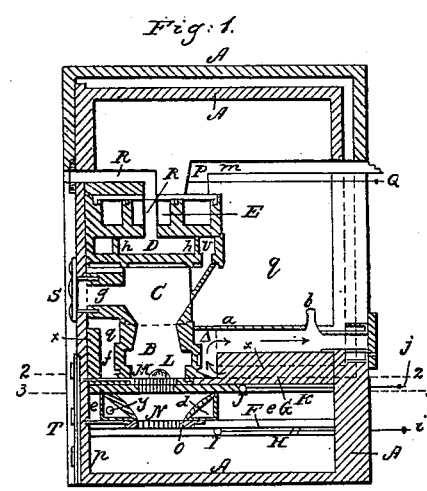
Figure 2:
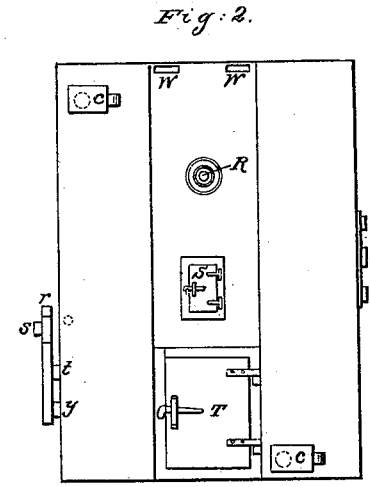
Figure 3:
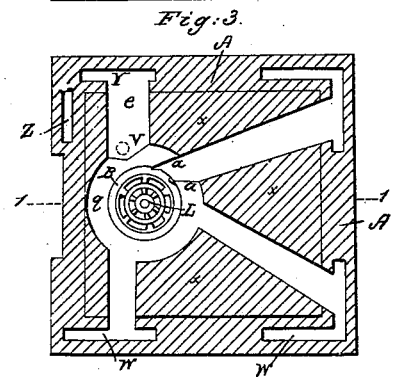
Figure 4:
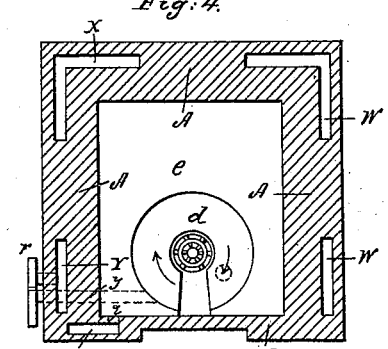

Figure 1 is a perpendicular section at the line 1, 1, in Fig. 3; Fig. 2 is a front view; Fig. 3 is a horizontal section at the line 2, 2, in Fig. 1; Fig. 4 is a horizontal section at the line 3, 3 in Fig. 1; and the remaining figures are representations of particular parts, hereinafter more fully described.

Figure 10:
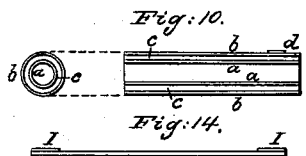
Figures 12, 13:
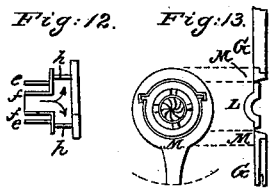

The same letters refer to the same parts except in Figs. 10 and 12 which are separately lettered.

Figure 14:
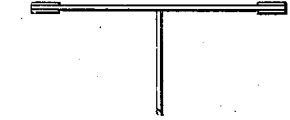

In constructing my furnace I first lay a brick floor about 6 ft. square, marked A, Fig. 1. Upon this I build perpendicularly the four brick walls also marked A, A, A, A, Figs. 1, 3 and 4, inclosing the furnace, which are double except in front. These double walls are about 4 inches apart having several separate spaces between them for the downward passage of cold air, as seen in Figs. 3, 4, nearly in the ordinary manner of constructing hot air furnaces. The inner one of the double walls is arched over at top from side to side; the arch is therefore not seen in the drawing Fig. 1, which is a section from front to rear; and the outer one is carried up straight and covered over with a flat covering, leaving a space between the outer and inner top, as seen in Fig. 1. Into this space the openings $w$, $w$, admit the cold air, as seen in Fig. 2. It will be seen by Figs. 3 and 4 that the space between the outer and inner walls is divided into several perpendicular air-passages W, W, X and Y; all of which however communicate with the space for cold air between the outer and the inner top. The lower part of the inclosing walls A, A, A, is on three sides made thicker, for about 20 inches, (that is the part below G, Fig. 1) to support the weight of the iron-work of the furnace, as seen in Fig. 4. About 8 inches from the brick floor are set, on the inside of each of the side brick walls, two horizontal projections H, H, running from the front to the back, which project from the wall about ¾ of an inch, and are about ¾ of an inch apart. These are represented in Fig. 1 as H, H. Upon the lower of these runs a crossbar and handle, shaped like a T, and shown in Fig. 14; the ends of the crossbar having rollers on them, seen at I, and the handle projecting out of the back side of the furnace and marked $i$. The rollers are to facilitate the movement of the crossbar on the horizontal projection, and the handle is to enable it to be pushed backward and forward. The upper one of these horizontal projections (which are made of iron) supports the lower bed-plate, F; in which rests the rim, O, of the sifting grate, N. The construction and operation of this rim and grate are similar to those of the coal grate and its rim and need not be separately described. Immediately upon this bed-plate is placed the cinder-pit, marked $d$, Figs. 1 and 4, the use of which is to collect the cinders upon the sifting-grate. This cinder-pit has around it a circular cavity or flue, the use of which will be hereafter described. K, K are two horizontal projections, similar to the former, placed about 8 inches above them, and having a similar cross-bar and handle, with its rollers, J, and handle, $j$, seen in Fig. 1, the cross-bar, like the former, extending across from one projection to the other and moving thereon. The space, $e$, between the lower bed-plate and the projection K is filled in with fire brick, except the part occupied by the cinder-pit, $d$, as seen in Figs. 1 and 4. Upon the upper projection, K, rests the upper bed plate G, extending, like the lower bed plate, F, completely across, meeting all of the four side brick walls, and forming as it were a horizontal partition, which entirely separates the parts above it from those below. Upon this upper bed plate, G, in a circular hole made to receive it rests the rim, M, of the coal grate, L. This rim and grate are represented in Fig. 13. The rim is circular, and is moved circularly by its handle upon the bed plate. The grate is hung a little out of its center by a pivot projecting at each side and fitting into a socket in the rim as seen in Fig. 13. Hence it will be seen that whenever the rim is moved the grate moves with it. The grate is hemi-spherical, or conical, in the center, and flat outside of the hemi-spherical, or conical, part, or in other words it is a flat grate, with a hemi-spherical, or conical, boss in the center, projecting upward and occupying in diameter about one half of the grate; both the boss and the flat part being grated. The object of this boss is to prevent the coal from packing, or becoming clogged, and to shake up the coal more effectually, when the grate is shaken by moving the handle of the rim.

The grate is supported by the cross-bar pushed forward under the grate by means of the handle. When this is drawn back, the grate turns on its pivots and the coal is dumped, this cross-bar and handle may be disused, and the grate may, if preferred, be supported by a pin fastened into the rim and pushed forward under the grate.

The sifting grate, N, is arranged in every respect like the coal grate, L, except that it is flat, with no boss.

Upon the upper bed plate, G, and immediately over the coal grate, L, rests the lower cylinder, B, holding the coal, and being about 16 inches high and about 20 inches in diameter. This cylinder has a projection all around it on the outside, and a corresponding cavity on the inside, about 8 inches in height, for the purpose of lining the cylinder with firebrick where the heat is most intense and thus preventing a white heat on the outside of the cylinder and also preventing the cylinder from cracking with the heat. Brick-work marked, $\pi$, $\pi$ is built upon the upper bed-plate G to the height of about 16 inches leaving a vacant circular space surrounding the cylinder, B; which space is marked $q$, and communicates with and forms part of the general hot air chamber $q$, as seen in Fig. 1. In this brick work are several horizontal air-passages seen in Fig. 3, leading from the perpendicular air-passages W, W, X and Y toward the cylinder, B; and the object of this brick-work is, in part, to bring the entering cold air into close contact with the cylinder, B.

Figure 5:
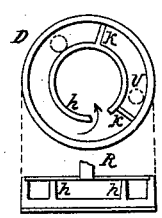
Figure 7:
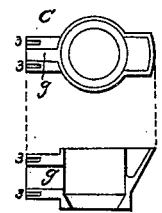

Fitting closely upon the lower cylinder, B, rests the upper cylinder, C, about 16 inches high and about 20 inches in diameter; having a mouthpiece, $g$, to receive the coal, connecting with the coal door, S, in the front brick wall. The shape of this cylinder is seen more plainly in Fig. 7. The end of the mouth-piece, it will be seen is made with a groove marked $\omega$, $\omega$, $\omega$, $\omega$, which is intended to receive a projecting tongue from the frame of the coal-door, S, as seen in Fig. 1. This tongue and groove are for the purpose of making the joint tight. The back side of this cylinder, C, has an oblique projection, connecting with the part of the furnace next above, and forming the passage for the smoke. Immediately upon this upper cylinder, fitting tightly to it, and forming its top rests, what I call, the hot air circular, D, seen more fully in Fig. 5. This circular is in form a low cylinder about 6 inches in height by 3 ft. in diameter. Within it is a circular partition, $k$, forming nearly a complete circle. There are also two cross partititions, $k$, $k$, one on each side of the opening, U, extending from the former partition to the side of the circular. The smoke passes from the upper cylinder, C, through the opening, U, into this part of the circular between the partitions, $k$, $k$, and thence into the smoke circular E, immediately above. The other uses of the hot air circular, D, will be described hereafter.

Figure 6:
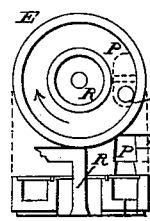

What I call the smoke circular, marked E, rests upon the hot-air circular, D, and is more fully represented in Fig. 6. It is a circular, horizontal flue, by which the smoke is carried around once in a horizontal direction as shown in Fig. 6, by the arrow, and then passed off into the smokepipe, $m$. There may be two or more circular flues in this circular, and the smoke, after passing through one, may be carried into another, but I have found one sufficient. The smoke passes from the circular, D, into the circular, E, through the short pipe, $n$, Fig. 6, and at, P, a damper is placed with a handle, Q, extending outside of the furnace, by which the smoke may be allowed to pass off at once into the smoke pipe, $m$, without going around through the circular, or may be compelled to make the circuit. The object of the circular, E, is to make a greater radiating surface, and this circular may, if preferred be placed perpendicularly, as well as horizontally, or two or more of the same kind may be used.

From the bottom of the perpendicular air passage, Y, a horizontal passage $\theta$ runs as seen in Fig. 3 through the brick-work, $\pi$, which does not communicate with the general hot air chamber, $q$. From, $v$, in the end of this passage a pipe runs perpendicularly to V, Fig. 5, for the supply of cold air to the hot air circular, D. The air entering this circular passes around in the direction of the arrow Fig. 5, and then through the pipe, R, out at the front of the furnace; thus furnishing a supply of hot air entirely separate from that furnished by the general hot air chamber, $q$. This is a principal part of the apparatus for conveying hot air to rooms situated at a distance horizontally from the furnace, at the same time that rooms above the furnace are heated from it. To accomplish this has always been a great desideratum, but is not within the powers of the furnaces in ordinary use. Connected with this hot-air circular, for the purpose of forcing the hot air in its horizontal movement through the pipe to be connected with R and carried to the room, I have two distinct arrangements, either of which may be used, as may be most convenient. The first is a blower, which may be used, whenever convenient (as, for instance, in manufactories) to force the air down the passage, Y, and then through the horizontal passage θ, and up through the pipe connecting $v$ and V as described into the hot air circular, D, and thus compel the hot air to pass off laterally, through R and the pipe connecting with it.

Figures 8, 9:
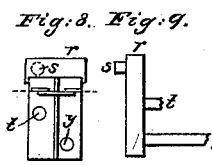

When the blower is used, the windbox, $r$, Figs. 8 and 9, with its dampers for changing the direction of the blast, will come into operation. In this windbox, $s$, is the pipe by which the blast is received from the blower; $t$, the pipe by which it passes into the air-passage Y, and $y$, the pipe by which it goes to feed the fire as hereafter explained. The operation of the dampers can be seen in Fig. 8, by which it will be perceived that, the blower being in use, the blast may be sent either through, $t$, or, $y$, or both. When the blower is used a damper in the air passage, Y, above the pipe, $t$, (not shown in the drawings) is closed to prevent the air from the blower from passing up this passage; when the blower is not used, this damper is opened, and the circular then receives its supply of cold air from the general supply to the furnace through the air-passage, Y. When no blower is used, and therefrom some other power is needed to force the air off laterally from the hot air circular, I accomplish this by the other arrangement which will be hereafter described. It will be seen that the windbox is entirely separate from the furnace, and the latter may be constructed without it and without a blower.

The pipe, $y$, conveying the blast from the blower to the furnace enters the spittoon shaped cinder-pit, $d$, as seen at, $y$, Figs. 1 and 4; and the blast passes around through this cinder-pit, as shown by the arrow Fig. 4; thence down through the dotted hole in the cinder pit, $d$, Fig. 4, and thence up through the sifting grate, N, to the fire, thus becoming heated and supplying a hot blast.

The perpendicular air passages, W, W, Figs. 3 and 4 are connected with the general hot air chamber, $q$, by the horizontal passages seen in the brick-work, π, Fig. 3, and thus supply cold air to be heated. The cold air however which passes down the air-passage, X, Figs. 3 and 4, is not permitted to mingle with the air in the general hot air chamber, $q$, but is confined by the two partitions $a, a$, Fig. 3, which extend from the brick work, π, across to the cylinder, B, and from the upper bed plate, C, to the top of the brick work π. These partitions are of iron; and on top of them runs a horizontal partition, also of iron, marked, $a$, Fig. 1, covering the space between the two partitions, $a, a$, Fig. 3 and extending from the cylinder B, to the outer wall A. Under this partition, $a$, Fig. 1, a passage is formed in the brick work below for the escape of the heated air. The air is thus compelled to pass as indicated by the arrow in Fig. 1, and a separate air chamber is formed, which is to be used for the purpose of warming a room adjoining the furnace, on the same floor. At, $b$, there is an escape pipe with a damper to let the heat generated in this separate air chamber pass into the general hot air chamber, $q$, when not needed elsewhere. This separate air chamber may be made higher by extending it along the side of the upper cylinder C, as well as the lower, B, carrying the partitions, $a, a$, up to the circular, D, and forming an iron passage at that height for the hot air to pass out, separate from the general hot air chamber, $q$.

An ash-drawer is placed beneath the sifting grate to receive the ashes. There is an ash-door at, T, to remove the ashes, and also the cinders in the cinder-pit, a place for that purpose being made in the pit as seen at Fig. 4. Another door at, $l$, Fig. 2, opens into the air chamber from the side of the furnace. To guard against the escape of hot air through this door, there is an inner slide door of sheet tin arranged on the inside of the wall.

Figure 11:
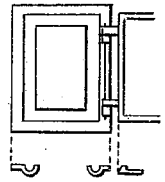

The doors of my furnace are all made with a projecting tongue around the edges fitting into a corresponding groove in the door frame, which groove, with part of the door is seen in Fig. 11. The doors can also be made, if desirable, with two or more similar tongues fitting into a corresponding number of grooves in the door frame, or, if preferred, the tongue may be made in the door frame and the groove in the door. The object of this is to make the furnace as tight as possible, a thing which is always desirable, but necessary in my furnace.

It will be seen that when the doors are all closed, and the damper in the windbox, which admits air to the fire from the blower, is shut, there is no place (as far as has yet been described) for the admission of air to feed the fire. For the air to feed the fire must come from under the bed plate, G, and the part of the furnace below this bed plate has (so far as has been described) no communication with the external air, when the doors are closed except through the pipe bringing the blast from the blower. By closing the damper in the windbox therefore and thus shutting off this pipe I exclude the air except through the passages which I am about to describe.

At $c, c$, Fig. 2 are two openings in the front brick wall of the furnace, each of which can be closed by a damper and to each of which a pipe can be attached. The lower opening opens directly into the space marked $p$, Fig. 1, under the lower bed plate F, and thus admits air up through the sifting grate, N, to the fire. It is in short a hole through the front of the furnace, under the bed plate, F, to supply air to the fire. The upper opening, $c$, does not pass entirely through the brick wall, A, but opens into an air-passage or descending flue (as it may be called) marked Z, Figs. 3 and 4; which flue passes from the top to the bottom of the front brick wall within the same. At the bottom of this flue Z there is an opening into the space, $p$, Fig. 1, under the lower bed-plate F, as may be seen at, $\varphi$, Fig. 4. This the air which enters at upper, $c$, passes down the flue Z and enters under F, at $\varphi$. From the lower, $c$, a pipe is to run to any room to be heated on the same floor with the furnace; and from the upper, $c$, a pipe is to run to any room to be heated on a floor above but at so great a distance horizontally as to make it difficult to force air into the room. Thus I draw the air for the supply of the fire from such rooms as it is difficult to heat with a furnace, on account of the hot air having to pass horizontally. By this means the hot air from the furnace is drawn in to supply the place of that taken from the supply of the fire. This arrangement is the one above mentioned to be used in connection with the hot-air circular; that is the hot air which is to go into such rooms is taken not from the general hot air chamber, $q$, but from the hot air circular, D, through the pipe R, Figs. 1 and 2. Thus as the hot air in D cannot pass off elsewhere, and as there is a constant draft into the room from which the cold air is taken to supply the fire, the hot air from the circular D is forced into that room, however great a horizontal distance it must pass. This same arrangement may also be used in connection with the general hot air chamber, $q$, that is the hot air from that chamber may be thus drawn into rooms lying at a distance horizontally from the furnace.

In other furnaces, where air is taken from rooms, it is for the supply of the hot air chamber, and thus the same impure air is heated and returned again and again; whereas in my furnace, the air taken from the rooms does not pass into the air-chamber, but is consumed by the fire, and fresh air is sent to supply its place.

The heated air from the furnace is conveyed to the rooms by pipes in the usual manner. The pipes and registers however are different from those in use, as seen in Figs. 10 and 12 which are lettered differently from the other drawings. I make double pipes of sheet tin one inclosing the other represented in Fig. 10 by, $a, a$, the inner and $b, b$, the outer pipe. The space between being about $\frac{1}{4}$ of an inch I fill with sand. In a horizontal pipe I pour the sand in through openings in the outer pipe as at, $d$, Fig. 10, at a convenient distance apart, say about 6 inches, which openings are afterward closed with a slide or in any other convenient manner. In perpendicular pipes I pour the sand in from above. I place occasional supports between the outer and inner pipes.

The construction of the registers is seen in Fig. 12; the flange $f, f$, fitting inside the inner pipe $a, a$, Fig. 10, and the flange, $e, e$, fitting inside the outer pipe, $b, b$. The hot air then passes in the direction of the arrow into the space $h, h$, and thence into the room through openings which are shut or opened by a circular damper moving on its center in the ordinary method. Registers have usually but one flange; but for securing the double pipes I find two flanges necessary. A similar arrangement is made where the pipes leave the furnace as R.

The advantages of my furnace over those in use are the conveying of hot air horizontally to heat a room at some distance from the furnace, at the same time that rooms over the furnace are being heated. In ordinary furnaces the heat will not pass horizontally (except after it has passed through a perpendicular pipe)—especially if it can pass upward. The heating at the same time a room adjoining the furnace on the same floor. The superior tightness of the furnace doors preventing the escape of hot air; and also the superior tightness of the connecting joint between the coal door and the mouthpiece of the upper cylinder, preventing the escape of hot air from the chamber up the draft. The greater tightness of the hot air pipes and the preventing the danger of fire where these pipes come in contact with partitions, &c. The greater ease in dumping and shaking the coal grate owing to its peculiar shape; as a flat grate suffers the coal to bed and a hemi-spherical grate will not dump easily. The improved manner of supporting the grates by introducing a rim between the grates and the bed-plates which renders it easier to shake the grate.

What I claim as my invention and desire to secure by Letters Patent is as follows:

1. I claim the invention of a grate with a hemi-spherical, or conical, projection or boss, rising upward in the center thereof; the part of the grate outside of said boss being flat; as an improvement upon former grates which are either flat or hemi-spherical or hemi-cylindrical; both the flat part and the projecting part of my grate being grated.

2. I do not claim the bed-plates, nor do I claim a circular coal-grate or sifting grate moving circularly in an opening made in the bed plate; but what I claim is the use of the circular rim which rests upon a circular opening in the bed plate and moves circularly thereon and upon which the grate hangs by pivots resting in sockets in the rim as above described; as an improvement upon the former mode by which the grate rested by its sockets immediately on the bedplate.

3. I claim the manner described of dumping the grate by means of the cross-bars and handles and the ways or projections for the cross-bars to move upon, the grate being suspended in the manner set forth.

4. I claim the separate air-chamber marked A, Fig. 1, constructed against the side of the lower cylinder, which may be extended to the top of the upper cylinder, for the purpose of heating an adjoining room as described above.

5. I claim the connecting of the part of the furnace below the fire, by means of a continuous air-passage and pipe with the room to be heated, so as to draw from that room solely the air for the support of the fire, for the purpose of creating a draft into that room of the hot air from the furnace; as above described.

6. I do not claim the cylindrical box or drum called the hot-air circular and represented in Fig. 5, nor do I claim the smoke circular, represented in Fig. 6; but I claim the combination of this smoke-circular with this cylindrical box or drum in the manner and for the purposes described.

Dated Albany March 18, 1847.

ROBERT HILLSON.

Witnesses:
 WM. L. LEARNED,
 RUFUS K. VIELL.